Sept. 12, 1950 — G. GUANELLA — 2,522,370
HIGH-FREQUENCY COUPLING DEVICE
Filed Nov. 2, 1946 — 2 Sheets-Sheet 1

INVENTOR.
GUSTAV GUANELLA
BY

Sept. 12, 1950  G. GUANELLA  2,522,370
HIGH-FREQUENCY COUPLING DEVICE
Filed Nov. 2, 1946  2 Sheets-Sheet 2
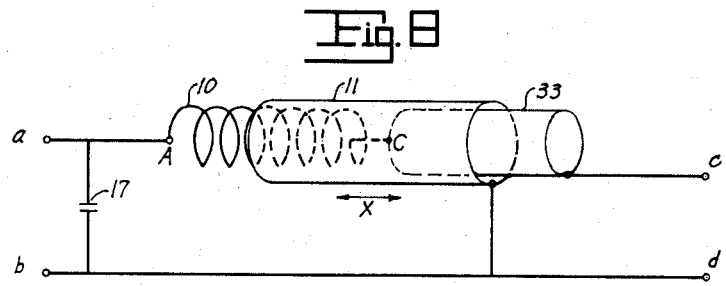
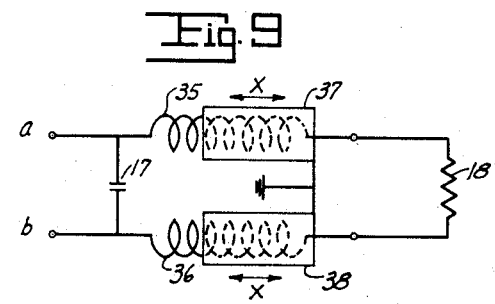
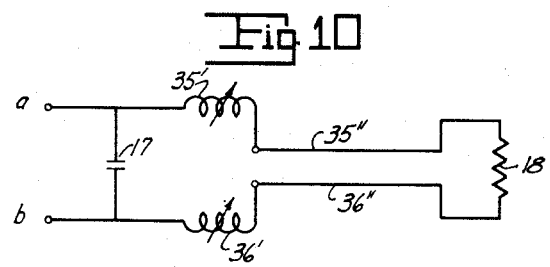
INVENTOR.
GUSTAV GUANELLA
BY Patented Sept. 12, 1950

2,522,370

UNITED STATES PATENT OFFICE 2,522,370

HIGH-FREQUENCY COUPLING DEVICE

Gustav Guanella, Zurich, Switzerland, assignor to Radio Patents Corporation, New York, N. Y., a corporation of New York Application November 2, 1946, Serial No. 707,479
In Switzerland December 17, 1942

Section 1, Public Law 690, August 8, 1946
Patent expires December 17, 1962

2 Claims. (Cl. 178—44)

This application is a continuation-in-part of my application, Serial No. 516,265, filed December 30, 1943, entitled High Frequency Coils With Variable Inductance, now abandoned.

The present invention relates to a four-pole circuit or coupling device, more particularly to a device of this type utilizing a unitary adjustable induction coil and capacitative impedance to serve as a coupling element for passing high frequency energy from an input circuit and output circuit in a simple and efficient manner.

The specific objects and novel aspects of the invention will become apparent from the following detailed description taken in reference with the accompanying drawings forming part of this specification and wherein:

Fig. 8 shows a modified construction of a coupling device according to the invention, and Fig. 9 and Fig. 10 show a circuit and equivalent diagram, respectively, illustrating still another application of the invention.

Like reference characters identify like parts in the different views of the drawings.

Figure 1:
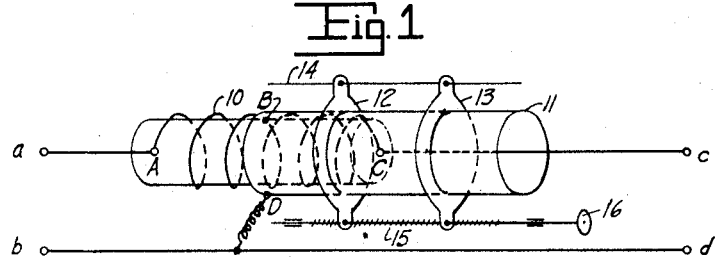
Fig. 1 shows a basic adjustable four-pole circuit or coupling device constructed in accordance with the principles of the invention.

Referring more particularly to Fig. 1, the coupling device shown comprises an induction coil 10, a hollow metal cylinder 11 concentrically enclosing said coil and arranged to be displaced or adjusted axially to cover or enclose a greater or lesser portion of the coil winding turns. Cylinder 11 is shown for this purpose provided with a pair of spaced annular flanges 12 and 13 having upper openings wherein is mounted a fixed guide rod 14. Said flanges are furthermore provided with lower threaded openings engaged by a threaded shaft or spindle 15 carrying an adjusting knob 16 at its extreme end. In this manner, the cylinder 11 may be displaced axially to cause varying relative portions A—B and B—C, respectively, of the coil 10 to be covered and uncovered by said cylinder.

If the distance of coil 10 from the adjacent surface of the cylinder 11 is small compared with the distance between adjacent coil winding turns, the mutual induction between the individual coil turns inside the cylinder will be practically negligible. Portion B—C of the coil enclosed by the cylinder may therefore be replaced by a straight conductor having a length equal to the stretched length of the enclosed coil portion B—C and spaced from a conductive surface by the same distance as coil portion B—C is spaced from the cylinder 11. This coil portion thus represents a two-wire Lecher line whose length depends upon the adjusting position of cylinder 11. The length of the free or uncovered coil portion A—B is varied at the same time in an opposite sense by the displacement of the cylinder 11, as is understood.

Accordingly, the coil structure shown in Fig. 1 represents a four-pole circuit or coupling device comprising an inductance in series with a capacity and having input terminals a—b and output terminals c—d, as indicated in the drawing. Such a coil may therefore serve as a potentiometric coupling device or transformer in a high frequency system for transmitting energy from the input to the output circuit, as shown more clearly in the various practical examples and applications of the invention described in the following.

Figure 2:
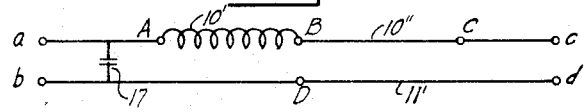
Fig. 2 shows an equivalent electrical circuit diagram of the device according to Fig. 1.

To further illustrate the underlying concept and function of the invention, there is shown in Fig. 2 an equivalent electrical circuit diagram of the adjustable coil structure described above and comprising the inductance 10' represented by the free or uncovered portion of the coil 10 and a two-wire Lecher line 10''—11' represented by the covered coil portion 10'' of the coil and the adjacent sliding metal cylinder 11, the remaining reference characters corresponding to those shown in Fig. 1. There is furthermore shown a tuning condenser 17 across the input terminals a—b, the load or output circuit to be connected to the output terminals c—d in a manner well understood. In such an arrangement the Lecher line capacity between conductors 10'' and 11' acts as a capacitative coupling impedance for transferring energy from the input to the output and may be adjusted by displacing the cylinder so to obtain a proper impedance match and to insure optimum energy transfer conditions.

In order to connect and adjust cylinder 11 relative to the fixed input and output terminals, sliding contacts, flexible terminal leads as shown in the drawing or equivalent connections may be used, as shown in the drawing between point D of cylinder 11 and terminals b and d.

Figure 3:
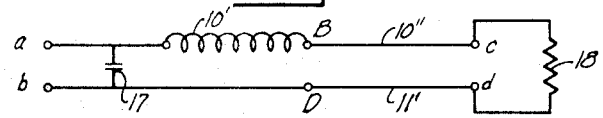
Fig. 3 and Fig. 4 are circuit diagrams illustrating practical applications of the invention.

In a simple embodiment of the invention shown diagrammatically in Fig. 3, a load impedance 18 in the form of an ohmic resistance which may represent an antenna or any other utilization circuit is connected to the output terminals c—d, that is between the adjustable cylinder and inner end C of the coil 10 as is readily understood from the above. If the load resistance 18 is equal to the characteristic or wave impedance of the Lecher line 10"—11', the transition impedance between the end B of the effective coil portion A—B and the adjustable cylinder 11 will be practically independent of the adjusting position of the cylinder. In most cases, this transition impedance of the Lecher line is small due to the short spacing distance between the coil 10 and the cylinder 11.

The load impedance 18 may be directly connected to the terminals c—d without any additional coupling means such as shown in Fig. 3. Alternately, it is possible as shown in Fig. 4 to connect the load resistance 18 through a line or cable 29 whose characteristic impedance in turn equals the impedance of the load 18.

Figure 4:
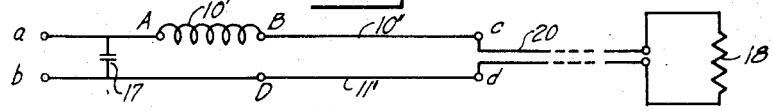
Figure 5:
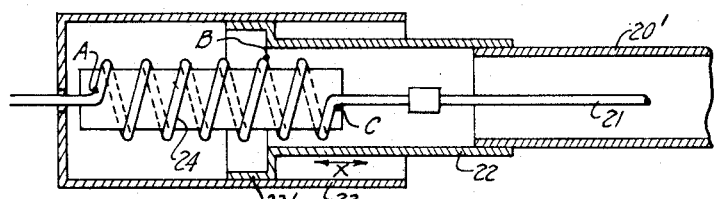
Fig. 5 shows a structural embodiment and practical application of the invention.

Fig. 5 shows a constructional embodiment of an arrangement according to Fig. 4. The outer conductor or shield and the core of a concentric cable are shown at 20' and 21', respectively. The adjustable cylinder 22 for the coil 24 is in direct sliding contact with the outer conductor or shield 20' of the cable. In order to prevent undesirable radiation and loss of high frequency energy, a further screening cylinder 23 is provided arranged at a substantial distance from the coil 24. This screening cylinder, in the example shown, also acts as a guide for the adjustable cylinder 22. For this purpose, cylinder 22 is provided with an enlarged end portion or flange 22' closely fitting and being in sliding engagement with the screening cylinder 23. The coil 24 which may be self-supporting or wound upon a suitable support has its inner or right end directly connected to core or inner conductor 21 of the cable, while the input current is applied between the outer or left-hand end of the coil and the cylinder 23, as will be readily understood from the above.

Figures 6, 7:
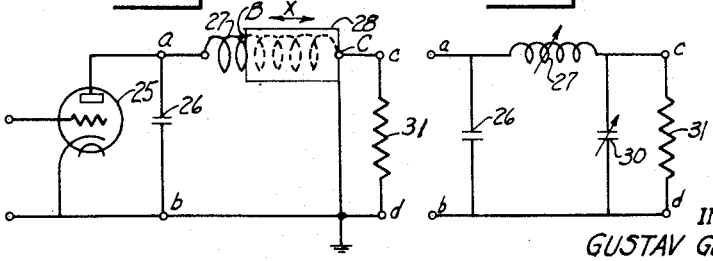
Fig. 6 is a circuit diagram showing the invention embodied in a vacuum tube amplifier.
Fig. 7 shows an equivalent electrical diagram explanatory of the function and operation of Fig. 6.

The use of a high frequency coupling device according to the invention in a vacuum tube circuit such as amplifier oscillator or the like is shown in Fig. 6. The coil 27 which forms a resonant circuit together with a fixed condenser 26 is connected in the plate circuit of a tube 25 in the usual manner of a parallel tuned output circuit. High frequency energy from this circuit is applied to a load resistance 31 such as a cable, antenna etc. by connecting the load resistance between the terminals c—d of the coil and by grounding or connecting the adjusting cylinder 28 to the cathode or other zero reference point of the system. In practice, the grounded electrode of tuning condenser 26 may be advantageously formed by the sliding cylinder 28, while the cooperating condenser electrode at the anode side is formed by a further metal cylinder arranged co-axially with and enclosing the sliding cylinder 23. By this means an exact symmetrical construction of the high frequency coil and condenser may be obtained.

Fig. 7 shows the equivalent electrical circuit diagram of Fig. 6. The variable inductance 27 represents the effective inductance of the coil while condenser 30 is equivalent to the inherent and adjustable Lecher wire capacity serving as coupling impedance for the load 31, in the manner described.

The resonance resistance of the circuit depends in a known manner upon the load resistance 31 and in general also upon the adjusting position of the cylinder 28, or in other words the relationship between the load resistance and the resonance resistance of the circuit is dependent upon the tuning adjustment. The load upon the tube, however, may be rendered practically independent of the tuning if the load resistance 31 has a pre-determined value which deviates from the characteristic impedance of the Lecher line coil portion by a pre-determined value. The resonance resistance may, however, also be maintained constant if the characteristic impedance of the Lecher wire portion of the coil is suitably chosen. The same object may be obtained by using a capacity having a suitable frequency response characteristic and being connected in series with the high frequency coil. Furthermore, it is possible to use a parallel capacity 26 for the circuit having a suitable frequency response curve.

As more clearly understood from the equivalent circuit diagram of Fig. 7, the induction coil according to the invention if connected in an electrical circuit in the manner shown in Figs. 3 to 6, constitutes a four-pole, L-type network or circuit having input terminals a—b and output terminals c—d and wherein the effective portion of the coil A—B constitutes the longitudinal series impedance of the capacity of the coil-to-sliding-body or equivalent Lecher wire line represents the transverse or parallel impedance of the network. If the covered coil portion B—C in Fig. 6 is short, the resultant Lecher line represents a capacity which decreases if the effective coil portion A—B is increased. A change of this capacity which in Fig. 7 is shown at 30 and which is in series with the effective inductance 27 tends to oppose at least partly the change of the inductance whereby to reduce the tuning range of the circuit. For this reason, it is advisable to provide an additional capacity between the end of the coil and the sliding cylinder. In the construction according to Fig. 8, this additional capacity is obtained by the provision of a cylindrical condenser formed by the sliding cylinder 11 and an auxiliary fixed cylinder 33 mounted inside the former. In this arrangement, the additional capacity decreases as the coil is more and more covered by the adjusting cylinder 11 in such a manner that the capacity between the coil and sliding cylinder will be constant or may even increase if necessary with an increase of the effective inductance of the coil. In this manner, the tuning variation may be increased by means of the additional adjustable capacity. It is also possible in this case, by suitably choosing the dimensions of the elements, to transfer the load resistance connected between the coil and sliding cylinder to the input terminals of the tuning circuit, such transfer being substantially independent of the tuning adjustment.

As is understood, the sliding cylinder 11 may also be arranged inside the coil 10 in place of the outside arrangement as shown in the drawings. Furthermore, the coil-to-cylinder capacity may be increased by using an adjusting member consisting of two cylinders covering the coil both on the inside and on the outside, as is understood. The capacity between the sliding cylinder and the coil may also be increased by using a coil made from flat wire, or wire having a square or rectangular cross-section.

There is thus provided by the invention an adjustable high frequency coupling device or circuit suitable for connecting a high ohmic oscillation circuit in series with a low ohmic load such as a cable or the like. The load resistance may be easily matched with the wave impedance of the ineffective or Lecher line coil portion in the manner described and understood from the above.

Referring to Figs. 9 and 10, there is shown a further application of a coupling device of this type embodied in a push-and-pull vacuum tube stage forming part of an amplifier, oscillator or any other circuit. According to this embodiment, the sliding cylinders for the various stages are electrically and mechanically connected and are advantageously at ground potential.

In Fig. 9, input terminals $a$ and $b$ are assumed to be connected or otherwise coupled with the anodes of a pair of push-pull vacuum tubes (not shown). The coils 35 and 36 having their input ends connected to points $a$ and $b$, respectively, are in series with each other as far as the high frequency current is concerned through the Lecher line capacities between the covered coil portions and adjustable cylinders 37 and 38. This series connection is effected by a direct connection and grounding of the cylinders 37 and 38. Both Lecher line capacities are therefore in series and are equivalent to a single capacity which serves as a coupling impedance for the load resistance 18. The equivalent electrical diagram for this arrangement is shown in Fig. 10, wherein the free or uncovered coil portions are represented by the inductance 35' and 36' and the equivalent Lecher line is shown at 35" and 36", the former providing the desired inductance or tuning adjustment together with the condenser 17 and the latter providing the necessary coupling impedance for the load resistance 18, the high frequency current passing through the relatively large capacity between the Lecher line conductors 35" and 36".

While there have been shown and described a few desirable embodiments of the invention, it is understood that this disclosure is for the purpose of illustration and that various changes in shape, proportion and arrangement of parts, as well as in the substitution of equivalent elements for those herein shown and described, may be made without departing from the spirit and scope of the invention as defined in the appended claims. The specification and drawings are accordingly to be regarded in an illustrative rather than a limiting sense.

I claim:

1. An adjustable four-pole coupling device having a pair of input terminals and a pair of output terminals and comprising a wire helix forming an induction coil, a coaxial hollow metallic cylinder enclosing said coil and axially adjustable relative to said coil, the spacing distance between the inside of said cylinder and said coil being small compared with the distance between adjacent winding turns of said coil, circuit connections from said input terminals to one end of said coil and said cylinder, and further circuit connections from said output terminals to the other end of said coil and said cylinder, respectively.

2. An adjustable four-pole coupling device having a pair of input terminals and a pair of output terminals and comprising a wire helix forming an induction coil, a coaxial circumferentially closed hollow metal cylinder enclosing said coil and axially adjustable relative to said coil, the spacing distance between the inside of said cylinder and said coil being small compared with the distance between adjacent winding turns of said coil, whereby to substantially suppress the mutual inductance effect between adjacent winding turns of said coil covered by said cylinder, circuit connections from said input terminals to one end of said coil and said cylinder, and further circuit connections from the output terminals to the other end of said coil and said cylinder.

GUSTAV GUANELLA.

REFERENCES CITED

The following references are of record in the file of this patent:

UNITED STATES PATENTS

| Number | Name | Date |
|---|---|---|
| 1,517,570 | Mauborgne | Dec. 2, 1924 |
| 1,850,914 | Bodoh | Mar. 22, 1932 |
| 1,893,618 | Forbes | Jan. 10, 1933 |
| 1,904,199 | Brewer | Apr. 18, 1933 |
| 2,115,826 | Norton et al. | May 3, 1938 |
| 2,158,493 | Brailsford | May 16, 1939 |
| 2,227,846 | Rust | Jan. 7, 1941 |
| 2,232,042 | Alford | Feb. 18, 1941 |
| 2,258,261 | Roosenstein | Oct. 7, 1941 |
| 2,299,571 | Dome | Oct. 20, 1942 |
| 2,465,102 | Joy | Mar. 22, 1949 |

FOREIGN PATENTS

| Number | Country | Date |
|---|---|---|
| 519,506 | Great Britain | Mar. 28, 1940 |